United States Patent Office 3,692,467
Patented Sept. 19, 1972

3,692,467
TEXTILE TREATING PROCESSES AND APPARATUS INVOLVING BOTH WATER AND AN IMMISCIBLE SOLVENT
Larry L. Durr, Indianapolis, and Byron Jan Clay, Brownsburg, Ind., assignors to Textile Technology, Inc., San Diego, Calif.
Filed July 6, 1971, Ser. No. 159,851
Int. Cl. D06f 43/08
U.S. Cl. 8—158                                           20 Claims

ABSTRACT OF THE DISCLOSURE

Process and apparatus are disclosed which relate to the use of water and a liquid halogenated hydrocarbon in textile processing. A device for rapidly and efficiently separating the two liquids is disclosed and uses a glass wool containing coalescer and a Teflon coated metal water screen. A method is also disclosed for removing the solvent from textiles.

BACKGROUND OF THE INVENTION

Field of the invention

This invention relates to textile processing which uses both water and a liquid halogenated hydrocarbon.

DESCRIPTION OF THE PRIOR ART

The removal of liquid halogenated hydrocarbon solvents remaining on textiles from previous processing has been accomplished in many ways. Typically this removal is done by subjecting the fabrics to hot air and then passing this air through condensers to reclaim the solvents. This results in an inferior "hand" or feel of the textiles and is time consuming. Alternatively, removal may be accomplished by subjecting the fabrics to steam, condensing the vapors, and passing the condensate through a water separator. Still another system passes the fabric through hot water and steam and condenses the vapors therefrom, the resulting condensate being separated with a water separator to obtain the water and solvent components. While these water techniques result in a satisfactory "hand," they require expensive condensers and steam equipment in addition to the fact that the water separator must be quite large to accommodate the volume of liquids necessary for proper solvent removal.

Typically in the prior art, water and perchlorethylene are separated after distillation by gravity in a water separator. A fiberglass containing coalescer prior to the water separator has been used to aid in separating the distilled mixture in a dry cleaning system. Such a coalescer, however, becomes ineffective after being subjected to surface active chemicals; thus the perchlorethylene and water must be free of such additives. Furthermore turbulence in connecting pipes redisperses the coalesced liquids before they reach the water separator.

SUMMARY OF THE INVENTION

This invention relates to textile processing which uses both water and a liquid halogenated hydrocarbon solvent. One aspect of the invention involves the use of a coalescer placed within a water separator and containing a material which is insoluble in either of the two liquids and which has a large surface area per unit volume. The coalescer permits the rapid, efficient separation at a high rate of flow of hot solvent-water emulsions and takes up very little room. Another aspect of the invention involves the use of a water screen to insure that no water exits from the solvent outlet of the water separator. This further increases the efficiency of the water separator and allows a further reduction in size.

Another aspect of this invention relates to the removal of residual liquid halogenated hydrocarbons remaining on textile after processing in mixtures containing a liquid halogenated hydrocarbon. It has been found that it is not necessary to vaporize the solvent to remove it from the textile, but that strong agitation of the textiles in hot water or strong turbulence of the water near the textiles will remove the hydrocarbons quite well. Because of the coalescer and water screen, separation of the hydrocarbons from the hot water is easily accomplished in spite of the high rate of water flow and the high temperatures. This method of removing solvent is more economical than methods requiring steam and condensing units because, among other reasons, it requires less energy and takes up less space.

DESCRIPTION OF THE PREFERRED EMBODIMENTS

Figure 1:
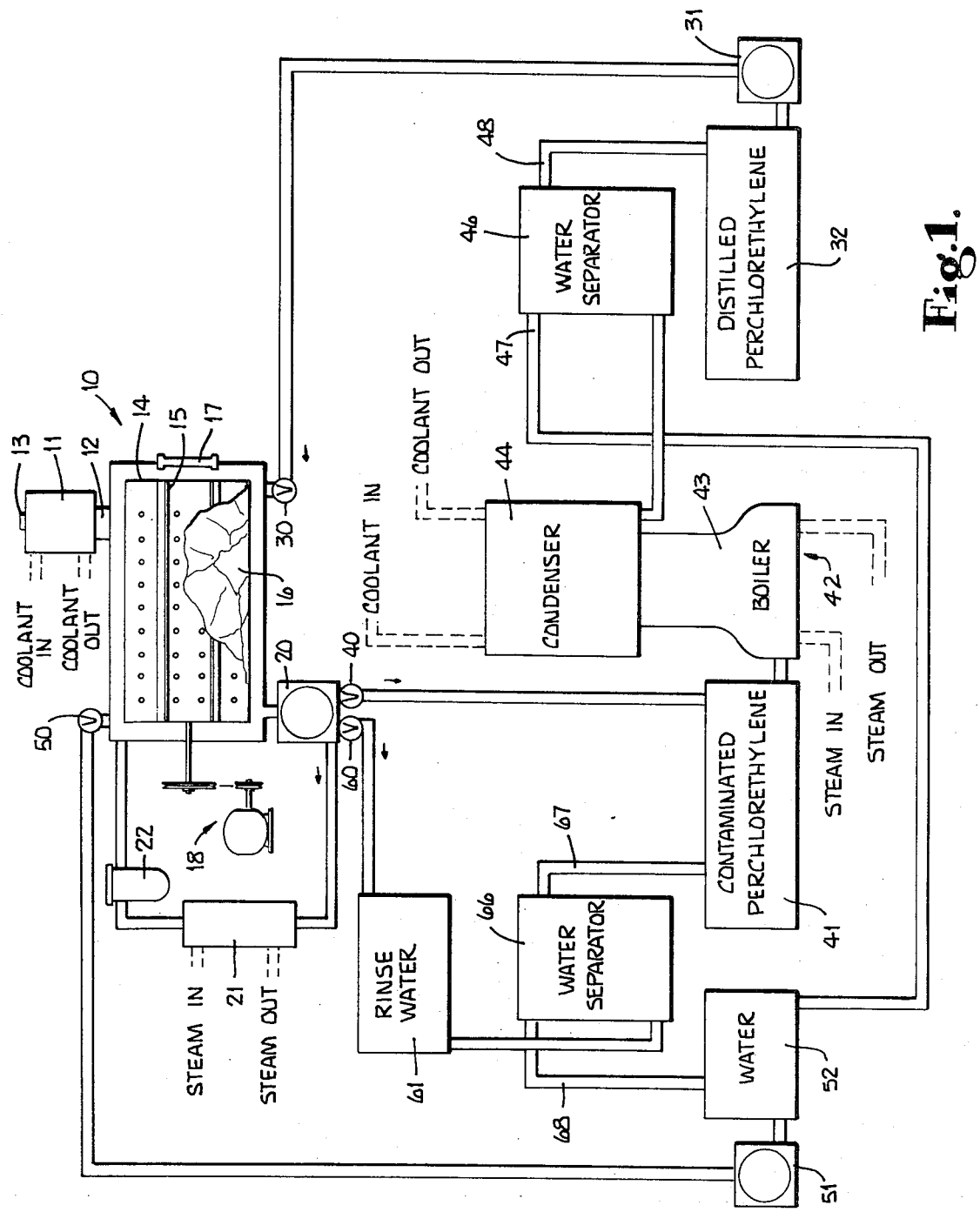
FIG. 1 is a diagram of a system which embodies the invention.

Referring to FIG. 1 there is illustrated a tumbler 10 similar to conventional tumblers used in the dry cleaning art, but modified in certain respects, described hereafter. A condenser 11 condenses vapors coming from the tumbler 10 through passage 12 and returns the condensate to the tumbler. A vent 13 on the condenser assures that atmospheric presure is maintained within the tumbler. The rotary drum 14 within the tumbler is made of perforated steel and has longitudinal ribs 15 which extend radially inwardly and serve to lift and tumble the textile goods 16 as the drum 14 is rotated. The tumbler has a conventional door 17 and drive mechanism 18. To circulate fluids within the tumbler there is a conventional mill pump 20 which can pump fluids through a heat exchanger 21 to a storage tank 22 to which may be added chemicals, water and/or dyes for treating the textiles. The storage tank connects to the tumbler.

Valve 30, when open, permits pump 31 to fill the tumbler to the desired level with distilled perchlorethylene from storage tank 32. After treatment of the textile goods with perchlorethylene and any treating compounds which may have been added, perchlorethylene drain valve 40 can be opened to allow drainage to a tank 41 for contaminated perchlorethylene. The contaminated perchlorethylene is purified by a still 42 which is of conventional design and which has a boiler 43 and a condenser 44. The condensate from the still connects to a water separator 46 shown in more detail in FIG. 2. The perchlorethylene outlet 48 of the water separator 46 empties into the distilled perchlorethylene storage tank 32. The water outlet 47 empties into the water storage tank 52.

Valve 50 when open permits pump 51 to fill the tumbler to the desired level with water from storage tank 52. After goods have been rinsed in the water, water drain valve 60 can be opened to allow drainage to a tank 61 for storing the rinse water. Any perchlorethylene contained in the rinse water is separated from the rinse water by a second water separator 66 which may be identical to water separator 46. The perchlorethylene outlet 67 of the water separator 66 empties into the contaminated perchlorethylene tank 41. The water outlet 68 empties into the water storage tank 52.

Figure 2:
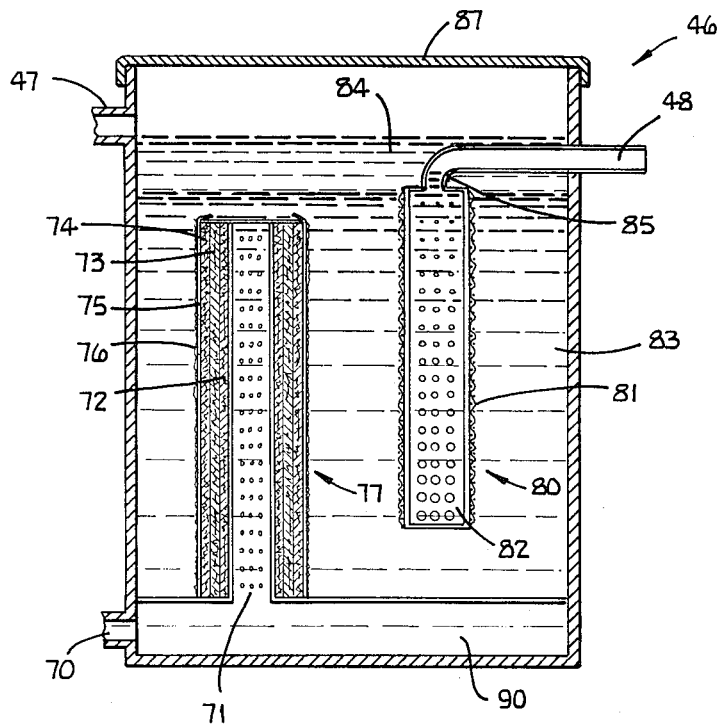
FIG. 2 is a diagram of a water separator containing a coalescer and a water screen. Two water separators as illustrated in FIG. 2 are used in the system of FIG. 1.

Referring in particular to FIG. 2, there is illustrated a water separator 46 for use with this invention. An inlet 70 allows a mixture 90 of perchlorethylene and water to enter the separator 46. The mixture 90 passes through a fiberglass filled coalescer 77, such as model No. 1–6186–T, made by Velcon Filters, Inc., 460 E. Brokaw Road, San Jose, Calif. 95112. The coalescer has a perforated metal center portion 71 and a perforated metal outer portion 75 covered with a cloth 76. The inner layer 72 of fiberglass has a fiber diameter of approximately 15 microns, the middle layer 73 has a fiber diameter of 3 microns and the outer layer 74 has a fiber diameter of 1.2 microns. The coalescer has the function of coalescing small suspended droplets of liquid to form large drops which separate much more rapidly than would small drops in a gravity separator. It is essential for satisfactory performance of the coalescer that it be located in the water separator, to avoid redispersion due to turbulence in the connecting pipes. While some amount of coalescing will occur as long as the coalescer material (72–74) is insoluble in either of the liquids and has a large surface area per unit volume, such as charcoal, fiberglass fibers have been found to be clearly superior to other materials.

To prevent suspended water drops from exiting through the solvent drain 48, a water screen 80 is placed across the outlet 48. The water screen, such as model SO–614 C made by Velcon Filters, Inc., has a 200 mesh Monel or stainless steel screen 81 coated on both sides with a tetrafluoroethylene polymer (Teflon). Because the polymer coating is hydrolithophobic, water droplets are prevented from passing through the screen to the solvent outlet 85. Water, being less dense than perchlorethylene, forms a layer 84 near the top of the separator and drains out the water outlet 47. A layer 83 contains water drops in perchlorethylene, and the perchlorethylene portion of the layer drains through the water screen to outlet 48. A loose fitting lid 87 keeps contaminants from entering the water separator and allows inspection and replacement of the water screen and coalescer elements. To permit efficient operation of the water screen, the solvent outlet 48 is connected with tubing 85 to a position below outlets 47 and 48. This permits operation of the water screen wholly within the perchlorethylene layer 83. In practice, the second water separator 66 is modified slightly to accommodate the high water flow and low perchlorethylene flow by lowering the perchlorethylene outlet and using a small water screen located near the bottom of the separator. This would provide the large layer of water desired with a high water flow rate. It may be noted that improved separation can be accomplished by placing two or more of these water separators in series to ensure that all suspended perchlorethylene is removed.

In use of the apparatus of FIG. 1, compounds for treating the textiles were added to tank 22 and the fabric 16 to be treated was placed in the tumbler 10. Valves 40, 50 and 60 were closed and pump 31 added perchlorethylene to the tumbler. Mill pump 20 circulated the perchlorethylene through the heat exchanger and through tank 22, thus mixing the treating compounds with the solvent. The drum 14 was rotated until treatment was finished, at which time valve 40 was opened and the tumbler drained. The fabric was then partially dried by rapid rotation of the drum.

After this, valve 40 was closed and pump 31 added more solvent to the tumbler 10. The fabric was agitated by rotation of the drum and then valve 40 was opened and the goods spun dry again. After this rinsing step, valve 40 was closed and valve 50 opened to allow filling of the tumbler with water from tank 52, for a water rinse. The water was heated by the heat exchanger 21 to a temperature of 70° C. and the tumbler rotated to cause agitation. After agitation had continued with the water at 70° C., the perchlorethylene became emulsified in the water. Valve 60 was then opened, the tumbler drained and the fabric 16 centrifuged by rapid rotation of the drum.

When liquid halogenated hydrocarbons other than perchlorethylene were used, different temperatures could be used for the water rinse, it being important that the temperature is high enough to encourage the formation of emulsion but below the boiling point of the mixture.

For perchlorethylene, it has been found that the temperature must be from about 60° C. to 87.7° C. for satisfactory results. Because the fabric was rinsed with solvent prior to the addition of water, the water from the water rinse contained very little contaminants and could pass directly to a water separator 66 for removal of perchlorethylene, without the need for distillation. The centrifugation of the fabric aids in the removal of solvent because perchlorethylene is more dense than water and tends to be spun off first, thus leaving the fabric only water wet. The water wet fabric can be handled by conventional techniques, without problem. This process thus avoids loss of solvent to the atmosphere, which is both costly and a pollution problem.

It may be noted that this process does not require the vaporization of the solvent, but rather it only requires that warm water be added so that an emulsion can easily form due to the mechanical agitation within the rotating drum. Because the water separator 66, as in FIG. 2, is used, the emulsion can be rapidly and inexpensively separated.

The water separator 46 can rapidly and inexpensively separate water and perchlorethylene contained in the condensate from condenser 44. To separate water from perchlorethylene at high flow rates previously required devices which were expensive and required a great amount of space. By placing the coalescer directly in the water separator, problems of turbulence between the coalescer and water separator are eliminated. The water screen in the water separator allows removal of only the perchlorethylene from a mixture of water drops in perchlorethylene, thus reducing the size needed for separation of the dispersion into two uniform phases.

EXAMPLE

In a textile treating apparatus of the aforedescribed type (FIG. 1), a sample of polyester knitted fabric was placed in the drum, and water, dye and an emulsifier were placed in the storage tank. Perchlorethylene was added and the mixture milled for 25 minutes at 87° C. After treatment, the mixture was drained and the fabric spun.

Perchlorethylene was again added and the drum was rotated for two minutes to provide a rinse for the fabric. After rinsing, the solvent was drained and the fabric spun.

Water was added and heated by the heat exchanger to 70° C. and the drum rotated for five minutes to provide agitation of the fabric in the water. After this rinsing, the water containing emulsified solvent was drained and the fabric spun. The emulsified solvent was removed from the water by a water separator of the type illustrated in FIG. 2.

The resulting fabric was slightly moist with water and no perchloroethylene odor could be detected from the fabric. The fabric exhibited an excellent hand when dried.

Since many embodiments might be made of the present invention and since many changes might be made in the embodiment disclosed herein, it is to be understood that the foregoing description and example are to be interpreted as illustrative only and that the invention is to be defined by the claims.

We claim:

1. Apparatus for use in applying a two phase chemically emulsified liquid, the liquid including water emulsified in an immiscible liquid halogenated hydrocarbon solvent, to textiles which comprises:
   (a) applying means for applying the two phase liquid to the textiles;
   (b) vaporizing means connected to said applying means for vaporizing the two phase liquid;
   (c) condensing means connected to said vaporizing means for condensing the vapors produced by said vaporizing means;
   (d) separation means connected to said condensing means for separating the liquids which were condensed, said separation means including a tank which has an inlet, a first outlet near the top to allow the less dense of the two liquids to flow out and a second outlet slightly lower than the first to allow the more dense of the two liquids to flow out, said second outlet being connected with tubing to a position lower than either the first or second openings; and (e) a coalescer within said tank and connected to said inlet whereby all of the liquids flowing into said tank are forced to pass through said coalescer, said coalescer containing a material insoluble in either of the two liquids and having a large surface area per unit volume.

2. Apparatus of claim 1 in which the insoluble material is fiberglass.

3. Apparatus of claim 2 in which said fiberglass contains fibers which have a fiber diameter of from 1 to 5 microns.

4. Apparatus of claim 1 which additionally has a water screen across said second outlet whereby droplets of the water are prevented from passing out of said tank through said second outlet.

5. Apparatus of claim 4 in which said screen is coated with a tetra fluoroethylene resin.

6. Apparatus of claim 4 in which said screen is about a 200 mesh screen.

7. Apparatus for use in applying a two phase chemically emulsified liquid, the liquid including water emulsified in an immiscible liquid halogenated hydrocarbon solvent, to textiles which comprises:

(a) applying means for applying the two phase liquid to the textiles;
(b) vaporizing means connected to said applying means for vaporizing the two phase liquid;
(c) condensing means connected to said vaporizing means for condensing the vapors produced by said vaporizing means; and
(d) separation means connected to said condensing means separating the liquids which were condensed, said separation means including a tank which has an inlet, a water outlet, a solvent outlet and water screen across said solvent outlet to prevent water from passing out said solvent outlet.

8. The apparatus of claim 7 in which said water screen includes an about 200 mesh metal screen.

9. The apparatus of claim 7 in which said water screen is coated with a hydrolithophobic material.

10. The apparatus of claim 9 in which the hydrolithophobic material is a tetra fluoroethylene polymer.

11. Apparatus for removing liquid halogenated hydrocarbon off of textiles which comprises:

(a) a container,
(b) textiles within said container which have a liquid halogenated hydrocarbon remaining on them from previous processing,
(c) applying means for applying hot water to the textiles within said container,
(d) separation means connected to said container for separating the water and the halogenated hydrocarbon, said separation means including a coalescer through which the liquids pass and which contains a material insoluble in either of the two liquids and having a large surface area per unit volume.

12. The apparatus of claim 11 in which the insoluble material is fiberglass.

13. The apparatus of claim 12 in which said fiberglass contains fibers which have a fiber diameter of from 1 to 5 microns.

14. The apparatus of claim 11 in which the separation means includes a tank which has a first opening near the top to allow the less dense of the two liquids to flow out and a second opening slightly lower than the first to allow the more dense of the two liquids to flow out, said second opening being connected with tubing to a position lower than either the first or second openings.

15. The apparatus of claim 11 in which said separation means includes a water screen placed across one of said openings, the water screen being made of a perforated metal coated with a tetra fluoroethylene resin, whereby water is prevented from exiting from said tank through the opening across which said water screen is placed.

16. Apparatus for removing liquid halogenated hydrocarbon off of textiles which comprises:

(a) a container,
(b) textiles within said container which have a liquid halogenated hydrocarbon remaining on them from previous processing,
(c) applying means for applying hot water to said textiles within said container,
(d) agitation means for agitating said textiles within said container,
(e) water separation means coupled to said container to separate dispersed liquid halogenated hydrocarbon from water, whereby said halogenated hydrocarbon can be removed from the textiles without the need to vaporize either the water or the halogenated hydrocarbon.

17. The apparatus of claim 13 in which said agitation means is a rotating drum.

18. A process for removing perchloroethylene off of textiles which comprises:

(a) rinsing, at least once, the textiles with pure perchloroethylene; and
(b) rinsing, at least once, with water heated to a temperature of from about 60° C. to about 87° C. and causing substantial agitation between the textiles and the rinse water.

19. The process of claim 18 which additionally comprises rotating the fabrics at a high speed whereby the centrifugal force will cause the liquids to be extracted from the fabric.

20. The process of claim 18 which additionally includes passing the rinse water through a coalescer containing fiberglass having a diameter of from 1 to 5 microns, whereby the perchlorethylene will be separated from the water.

References Cited
UNITED STATES PATENTS

| | | | |
|---|---|---|---|
| 1,814,212 | 7/1931 | Glover | 68—18 F |
| 2,158,614 | 5/1939 | Reddish | 68—18 R X |
| 2,614,026 | 10/1952 | Lascari | 68—18 F X |
| 3,473,175 | 10/1969 | Sieber | 68—18 R |
| 3,583,181 | 6/1971 | Brillet | 68—18 F |

WILLIAM I. PRICE, Primary Examiner

U.S. Cl. X.R.

68—18 C, 18 F